(12) United States Patent
Lee et al.

(10) Patent No.: US 8,205,159 B2
(45) Date of Patent: Jun. 19, 2012

(54) SYSTEM, METHOD AND MEDIUM ORGANIZING TEMPLATES FOR GENERATING MOVING IMAGES

(75) Inventors: Hye-jeong Lee, Seoul (KR); Min-kyu Park, Seoul (KR); Ji-hye Chung, Seoul (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 771 days.

(21) Appl. No.: 11/898,206

(22) Filed: Sep. 10, 2007

(65) Prior Publication Data
US 2008/0148153 A1    Jun. 19, 2008

(30) Foreign Application Priority Data
Dec. 18, 2006  (KR) .................. 10-2006-0129535

(51) Int. Cl.
G06F 3/14    (2006.01)
G06F 3/17    (2006.01)

(52) U.S. Cl. ........ 715/719; 715/234; 715/731; 345/473; 345/474; 345/838; 709/232

(58) Field of Classification Search .......... 715/200–277, 715/700–867; 700/701–866; 709/201–229; 705/50–79; 345/30–111; 348/206–231.9; 257/355
See application file for complete search history.

(56) References Cited

U.S. PATENT DOCUMENTS

| | | | | |
|---|---|---|---|---|
| 7,155,676 B2 * | 12/2006 | Land et al. | ..................... | 715/731 |
| 7,262,775 B2 * | 8/2007 | Calkins et al. | ................. | 345/473 |
| 2003/0146915 A1 * | 8/2003 | Brook et al. | .................. | 345/473 |
| 2004/0001106 A1 * | 1/2004 | Deutscher et al. | ............ | 345/838 |
| 2005/0149557 A1 | 7/2005 | Moriya et al. | | |
| 2005/0265692 A1 | 12/2005 | Kaku et al. | | |
| 2005/0289466 A1 | 12/2005 | Chen | | |
| 2006/0188237 A1 | 8/2006 | Watanabe et al. | | |
| 2006/0274070 A1 * | 12/2006 | Herman et al. | ............... | 345/474 |

(Continued)

FOREIGN PATENT DOCUMENTS

CN    1622585 A    6/2005

(Continued)

OTHER PUBLICATIONS

Chapter 4 The Live Slide Show (pp. 1-96) (in English).

(Continued)

*Primary Examiner* — Ruay Ho
(74) *Attorney, Agent, or Firm* — Staas & Halsey LLP

(57) ABSTRACT

A system, method and medium organizing a template, which enables a user to easily create moving images, are provided. The system includes a template controller to generate a time tab indicating when to display the moving image and to identify one or more scenes of the moving image by parsing a script in response to a user command, a scene controller to identify one or more objects included in each of the scenes and an execution module to define dynamic effects for each of the objects and to load the identified objects and the identified execution module, an object controller to create a control code for each of the identified objects based on the loaded objects and the loaded execution module, the control code controlling the identified objects according to the time tab, and a template storage unit to store the template that includes the script, the execution module, the objects, and the control code.

25 Claims, 8 Drawing Sheets

U.S. PATENT DOCUMENTS

| | | | |
|---|---|---|---|
| 2007/0005795 A1* | 1/2007 | Gonzalez | 709/232 |
| 2007/0102764 A1* | 5/2007 | Ando et al. | 257/355 |
| 2008/0126939 A1* | 5/2008 | Chung et al. | 715/723 |
| 2009/0119578 A1* | 5/2009 | Relyea et al. | 715/234 |

FOREIGN PATENT DOCUMENTS

| | | |
|---|---|---|
| EP | 1498899 A1 | 1/2005 |
| GB | 2419768 A | 5/2006 |
| JP | 9-81373 | 3/1997 |
| KR | 2003-0079836 | 10/2003 |
| KR | 10-2004-0079490 | 9/2004 |
| KR | 10-2005-0108677 | 11/2005 |
| WO | WO94/28480 | 12/1994 |

OTHER PUBLICATIONS

Yang et al., "MPML-FLASH: A Multimodal Presentation Markup Language with Character Agent Control in Flash Medium", Distributed Computing Systems Workshop, Mar. 2004, IEEE, (6 pgs) (In English).

European Search Report for corresponding European Patent Application No. 07123109.6 dated Jul. 2, 2008 (16 pgs) (In English).

Chinese Office Action for corresponding Chinese Patent Application No. 200710160809.0 dated Sep. 9, 2010, 4 pgs.

Japanese Office Action dated Feb. 7, 2012 issued in corresponding Japanese Patent Application No. 2007-319076.

* cited by examiner

SYSTEM, METHOD AND MEDIUM ORGANIZING TEMPLATES FOR GENERATING MOVING IMAGES

CROSS-REFERENCE TO RELATED APPLICATIONS

This application claims priority from Korean Patent Application No. 10-2006-0129535 filed on Dec. 18, 2006 in the Korean Intellectual Property Office, the disclosure of which is incorporated herein by reference in its entirety.

BACKGROUND

1. Field

One or more embodiments of the present invention relate to moving images, and, more particularly, to a system, method and medium of organizing templates for generating moving images so that a user may more easily create moving images.

2. Description of the Related Art

Slideshow presentations are one of the most widely adopted methods for displaying a number of content items such as photos. In a slide show, a plurality of content items, such as photos, are displayed one after another at regular time intervals. With the slideshow presentation, the playback of content may be interrupted for a predetermined period of time, suggesting that a slideshow can only display content in a non-successive manner, and thus may not be able to freely organize content according to a user's preference. Thus, the slideshow presentation is not appropriate to best cope with the recent trend in user's demand for personalized images and dynamic presentations created from the images.

Also, since, in a slideshow, only one content item is displayed at a time, a user may not be able to intuitively determine the correlation between previous, current, and subsequent content items, and to render the content items in various manners. That is, since a slideshow is a static display of content items at regular time intervals, a user may not be able to intuitively determine the correlation between the content items even if the content items are photos taken at the same place.

Therefore, in order to overcome the problems with the conventional monotonous slideshow presentation method, additional objects such as stickers and captions may be added to content, and various dynamic effects such as zoom, pan, and tilt may be added to content. Conventional slideshow methods, however, simply display content in the same manner and are thus still insufficient to meet various user demands.

Although the production of moving images based on personal content is on the increase in terms of frequency, conventional tools for content creation still require users to acquire professional expertise. In addition, it is difficult to transform user-created content to a compatibly formatted content that can be transmitted to or shared with different types of devices. In order to address this problem, various techniques of enhancing user convenience by creating a moving image based on user-created content have been suggested. These techniques enable users to create a moving image based on a collection of various content items, and thus apply the moving image to a home server through transmitting and sharing it. Moving images are execution-module-based images created based on photos, digital photos, and music sources possessed by individuals. Examples of moving images include Macromedia's Shockwave Flash (SWF) files created using the Flash animation software program.

Moving images are distinguished from video sequences which can be compressed or decompressed by MPEG or H.264 codecs. A moving image may include a plurality of content items which can be controlled independently of one another, whereas a video sequence may include various images which merely comprise pixel data, and which cannot be controlled independently of one another. Video sequences are regarded as content items that can be included in a moving image.

In order to create a moving image, it is necessary to develop functions capable of satisfying user demands by constructing various content items into a moving image and adding various effects to the moving image. In the meantime, the production and sharing of content by users has become commonplace, and such content is referred to as user-created content (UCC).

With the increasing presence of UCC, templates, which are tools for helping users to easily create moving images based on their personal content, have become widespread. However, even though templates can maximize user convenience by helping users to easily create moving images, there is a clear limit in the flexibility of templates. Thus, in order to create various moving images, it is necessary to provide users with a considerable number and variety of templates.

Users would like to produce creative moving images and replace template elements such as background images or stickers with their own pictures. In order to satisfy such user demands, it is necessary to develop effective tools for helping ordinary users easily create and organize templates for creating moving images.

In general, in order for ordinary users to easily use template-organizing tools, template-organizing tools must be able to create a template with only a few mouse manipulations, to operate properly even in connection with moving-image-generation tools, and to provide time-structured images so that users can easily perform various control operations such as rewind, skip, and arbitrary access operations on moving images.

Most organizing functions provided by conventional template-organizing tools are classified as timeline organizing functions such as those provided by Flash for creating time-structured images. FIG. 1 illustrates the setting of timelines 22 for content 21 for creating a time-structured image using Flash.

Referring to FIG. 1, a user must manually designate a timeline 22 for each object (such as a photo, a sticker, or a background). The designation of a timeline 22 must be performed whenever a new object is added or whenever an existing object is modified. Once the designation of timelines 22 for all objects that constitute a moving image is complete, the moving image can be played back in units of frames or a time-seek operation can be performed on the moving image.

However, it is difficult for non-expert users to create moving images using conventional template-organizing tools. Therefore, it is necessary to develop template-organizing tools capable of enabling templates to be time-seekable even when the templates are constructed simply by selecting elements without consideration of timelines.

SUMMARY

One or more embodiments of the present invention provide a system, method and medium for organizing a template, which can allow a user to more easily generate templates for creating moving images and to appropriately set a variety of attributes of each element of a moving image according to the user's preferences.

Additional aspects and/or advantages will be set forth in part in the description which follows and, in part, will be apparent from the description, or may be learned by practice of the invention.

To achieve at least the above and/or other aspects and advantages, embodiments of the present invention include a system organizing a template for creating a moving image. The system includes a template controller to generate a time tab indicating when to display the moving image and to identify one or more scenes of the moving image by parsing a script in response to a user command, a scene controller to identify one or more objects included in each of the scenes and an execution module to define dynamic effects for each of the objects and to load the identified objects and the identified execution module, an object controller to create a control code for each of the identified objects based on the loaded objects and the loaded execution module, the control code controlling the identified objects according to the time tab, and a template storage unit to store the template that includes the script, the execution module, the objects, and the control code.

To achieve at least the above and/or other aspects and advantages, embodiments of the present invention include a method of organizing a template for creating a moving image. The method includes identifying one or more scenes of a moving image by parsing a script in response to a user command, generating a time tab indicating when to display the moving image, identifying one or more objects included in each of the scenes and an execution module that defines dynamic effects for each of the objects, loading the identified objects and the identified execution module, creating a control code for each of the identified objects based on the loaded objects and the loaded execution module, the control code controlling the identified objects according to the time tab, and storing the template that includes the script, the execution module, the objects, and the control code.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
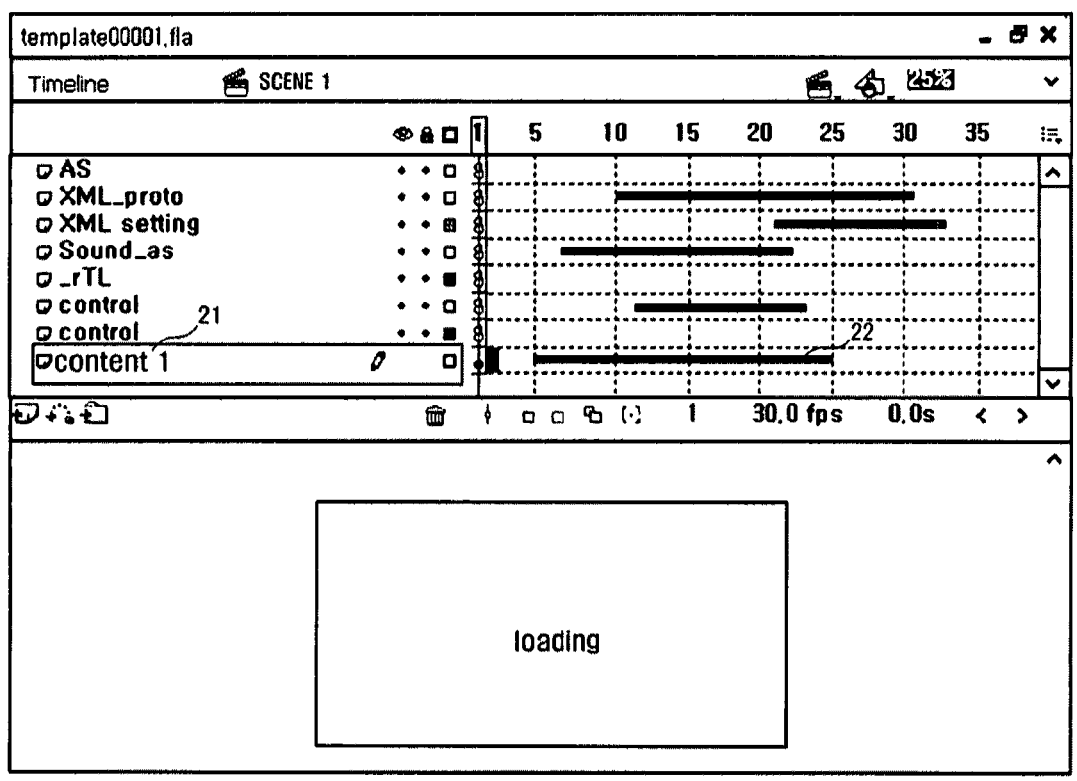
FIG. 1 illustrates the conventional setting of timelines for content for creating a time-structured image using Flash.

Reference will now be made in detail to embodiments, examples of which are illustrated in the accompanying drawings, wherein like reference numerals refer to the like elements throughout. Embodiments are described below to explain the present invention by referring to the figures.

In accordance with one or more embodiments of the present invention, moving images may include content elements such as photos or video sequences, decorative elements such as background music, stickers, captions, intro scenes, and end scenes, and effect elements such as transition, animation, and camera-work effects. The transition effect varies the attributes of an image such as transparency when a scene or an object appears or disappears, the animation effect varies the position and size of an object over time at various speeds, and the camera-work effect offers the effect of moving a camera without moving an object. The term "object", as used herein, generally denotes an element of a moving image, and photos, sounds, video sequences, backgrounds, stickers, and captions may be collectively referred to herein as objects.

Figure 2:
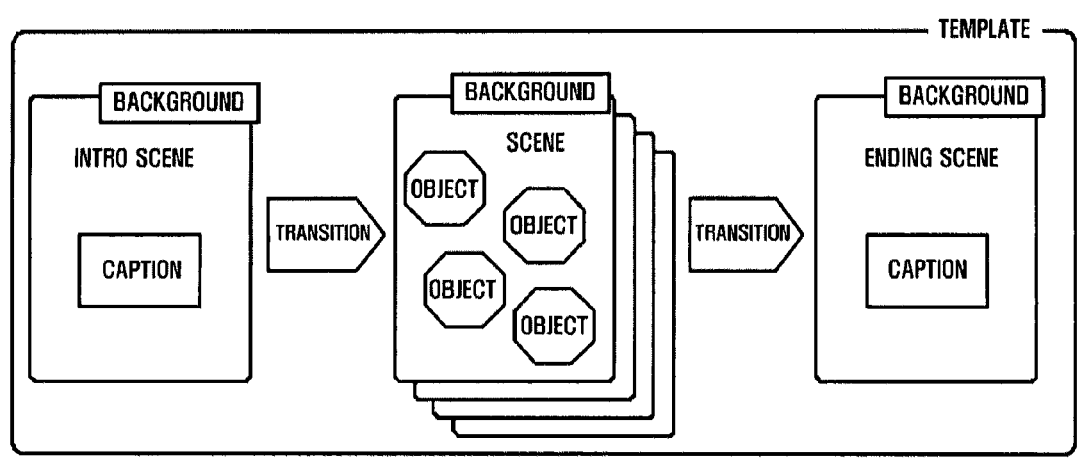
FIG. 2 illustrates a template, according to an embodiment of the present invention.

FIG. 2 illustrates a template, according to an embodiment of the present invention. Referring to FIG. 2, a template may include a plurality of scenes. Each of the scenes may include a variety of objects, and each of the objects may have dynamic effects and attributes. The attributes of an object are values that quantify the characteristics of the object. For example, the attributes of an object may include the x- and y-axis coordinates, depth, rotation angle, width, height, and transparency of the object. The dynamic effects may be implemented as an independent execution module such as a Macromedia Flash Movie file (i.e., a Shockwave Flash (SWF) file).

Figure 3A:
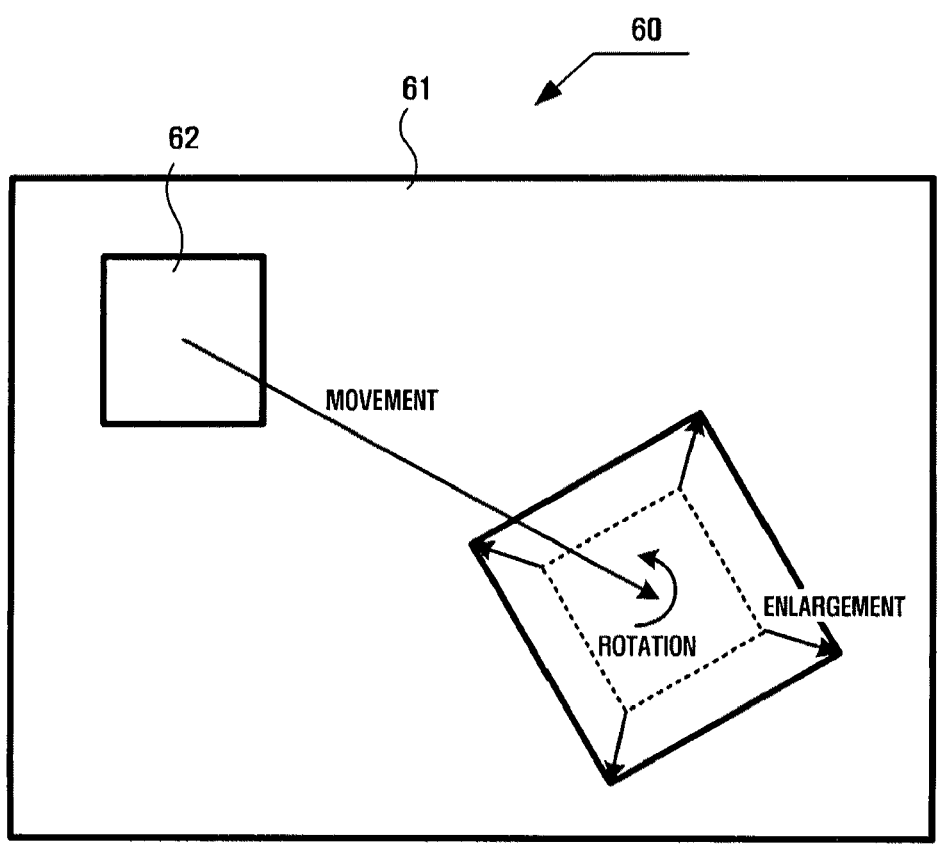
FIGS. 3A and 3B illustrate dynamic effects, according to an embodiment of the present invention.
Figure 3B:
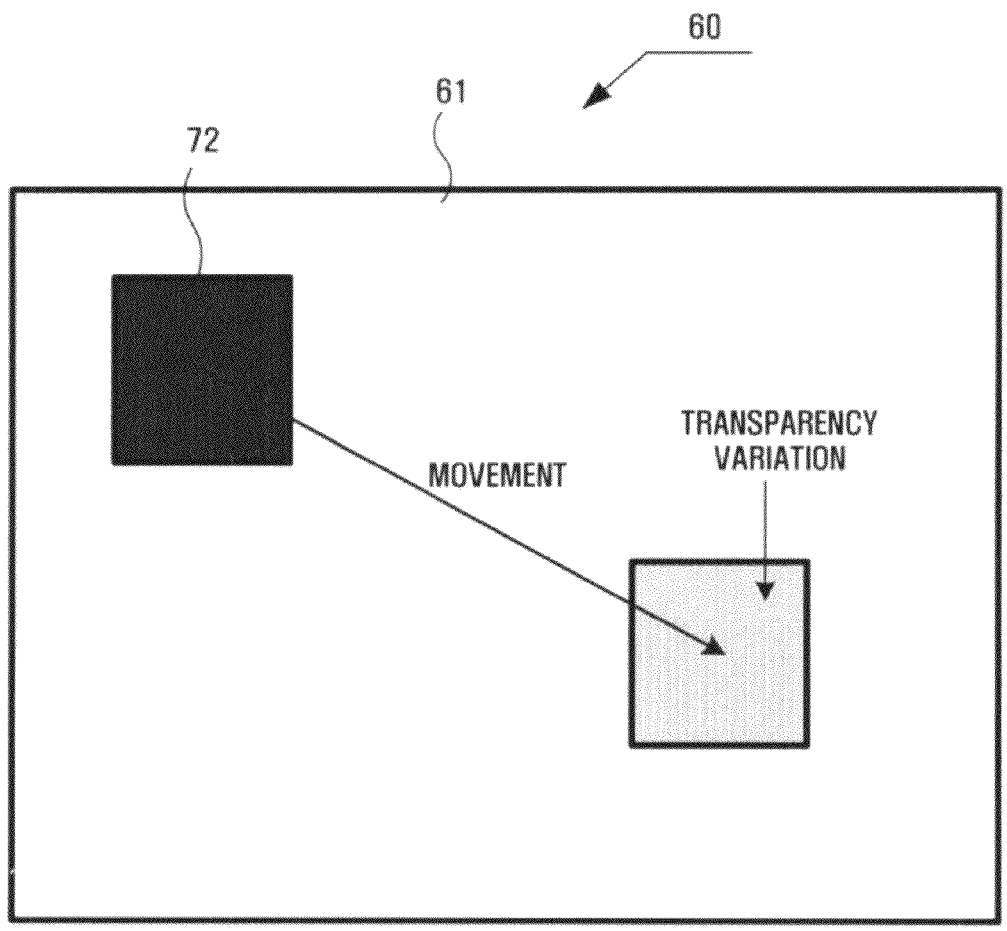

FIGS. 3A and 3B illustrate dynamic effects. More particularly, FIG. 3A illustrates an object to which an animation effect may be applied. Referring to FIG. 3A, a scene 60 may include a background 61. An object 62 included in the scene 60 may be either moved, rotated, or enlarged, for example. Alternatively, the movement, rotation, and enlargement of the object 62 may all be performed at the same time.

FIG. 3B illustrates an object to which a transition effect may be applied. Referring to FIG. 3B, an object 72 included in a scene 60 may be moved while varying the transparency of the object 72, for example. Once the transparency of the object 72 reaches 1 (or 100%) and the duration of the object 72 expires, the object 72 may no longer be displayed. Such a dynamic transition effect allows a user to recognize a moving image played in the same manner as in a general video sequence.

Figure 4:
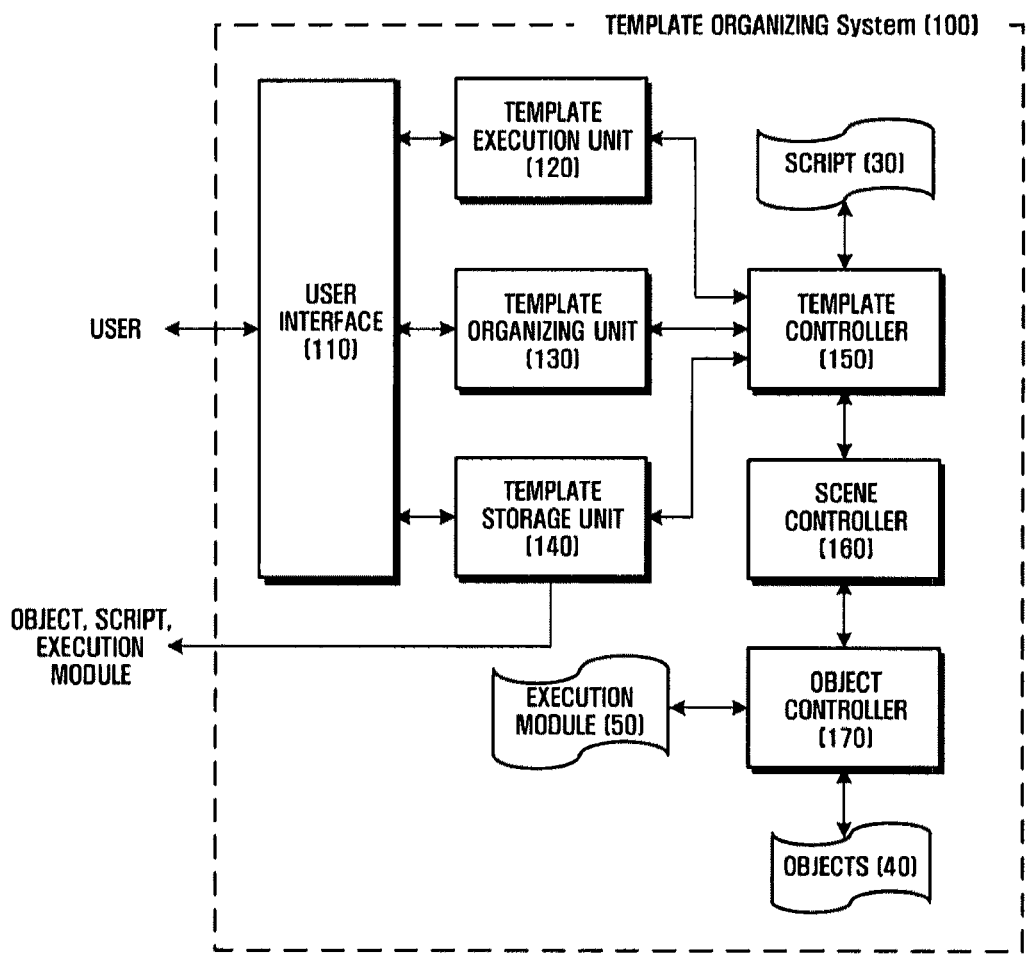
FIG. 4 illustrate a system for organizing a template, according to an embodiment of the present invention.

FIG. 4 illustrates a system organizing a template, according to an embodiment of the present invention. Referring to FIG. 4, the template organizing system 100 may include, for example, a user interface 110, a template execution unit 120, a template-organizing unit 130, a template storage unit 140, a template controller 150, a scene controller 160, and an object controller 170.

The template controller 150 may generate and manage a time tab that can be referenced by each scene or object. The template controller 150 may parse a script 30, store the script 30 in a memory (not shown), and manage the script 30. The template controller 150 may provide an application programming interface (API) so that the scene controller 160 can reference the script 30. If a template is modified by a user, the template controller 150 may modify the script 30 accordingly, and store the modified script.

The script 30 may be data that defines the whole structure of a moving image. The moving image may include a plurality of scenes, and each of the scenes may include a variety of objects. Table 1 presents an example of the script 30, which may be obtained by writing in XML, a template and a moving image created using the template.

TABLE 1

| | | Template | Moving Image |
|---|---|---|---|
| XML Config- uration | Start | | <photostory> </photostory> |
| | Information Shared with External Source | | <head> <meta name="attribute name" content="attribute"> </head> |
| | Font | | <sharedfont url=".swf"> |
| | Background Sound | | <bgsound url=".mp3" /> (url = relative path with respect to $(photostory name)/$(template name)) |
| | Scene | Intro & Ending | <scene name="intro/ending" url="./scene/*.swf" mincontent="-1" maxcontent="-1" transin=".swf" > <data><bgimg> <cut> <sticker> <caption> </scene> |
| | | Background Image | <bgImg url=".swf"> |
| | | Sticker | <sticker position="1" url="./sticker/*.swf" x="" y="" width="" height="" rotation="" /> |
| | | Caption | <caption url="./caption/*.swf" color="" align="" x="" y="" width="" height="" rotation="" /> |
| | | Photo | <content url=".jpg" isPortrait="false" title="photo description" dur="0" width="640" height="480" date="yyyy.mm.dd"/>(url = full path) |

Referring to Table 1, the term "Intro" denotes an overview image that may include the introductory message of a moving image before a user's content appears. Portions of the moving image that share the same background are referred to as scenes, and users are allowed to view scenes one by one. A scene may include, for example, a user's photos, decorative elements (such as stickers and captions), and dynamic effects. The term "Ending" denotes an image that may sum up the whole story of moving images, including photos of a user, when the display of the moving image is terminated. The same background sound may be applied to a whole moving image or different background sounds may be applied to different scenes of a moving image. The script 30 may display all elements of a moving image using a markup language.

Figure 5:
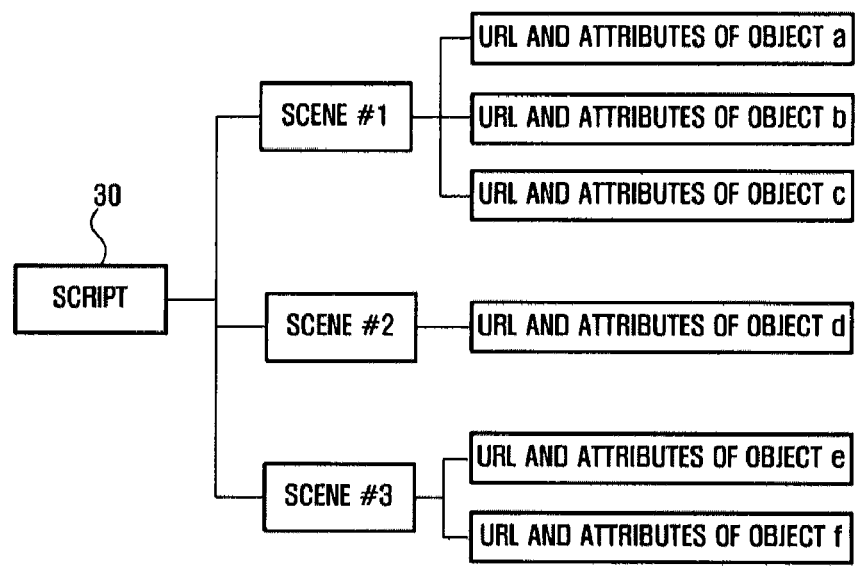
FIG. 5 illustrate the structure of the script illustrated in FIG. 4.

FIG. 5 illustrates a possible structure of the script 30. Referring to FIG. 5, the script 30 may include, for example, a plurality of scenes, e.g., scenes 1, 2, and 3, and each of scenes #1, #2, and #3 may include one or more uniform resource locators (URLs) for identifying corresponding objects, and the attribute values of the objects at any given moment of time. The URLs in each of scenes 1, 2, and 3 may be used to load the objects (e.g., objects 40 illustrated in FIG. 4). The attributes of an object are generally values that quantify the characteristics of the object at any given moment of time. For example, the attributes of an object may include, for example, the x- and y-axis coordinates, depth, rotation angle, width, height, and transparency of the object. The x- and y-axis coordinates of an object may be determined with respect to the upper left corner of the background of the object. Also, where one more objects are located at the same position, the depth may indicate the priority in which the overlapping objects are displayed. For example, if a picture object has a higher display priority than a sticker object and if the two objects should occupy the same space in a displayed image, the picture object may appear opaque and obscure the sticker object to some degree, based on the respective display priorities of the objects.

A URL written in the script 30 may be the URL of the object 40 or the URL of an execution module 50 that defines dynamic effects for the object 40. The execution module 50 may be implemented as an SWF file, for example. Referring to Table 1, the URL of a caption may be set as "./caption/*.swf" where "*.swf" does not simply indicate the URL of the caption but indicates the URL of an execution module that represents dynamic effects regarding the caption.

In the template organizing system 100 illustrated in FIG. 4, the template controller 150 may control the scene controller 160, and the scene controller 160 may control the object controller 170. That is, the template controller 150, the scene controller 160, and the object controller 170 may be arranged hierarchically according to a hierarchical structure of a template which includes a plurality of scenes, each scene including a plurality of objects.

Figure 6:
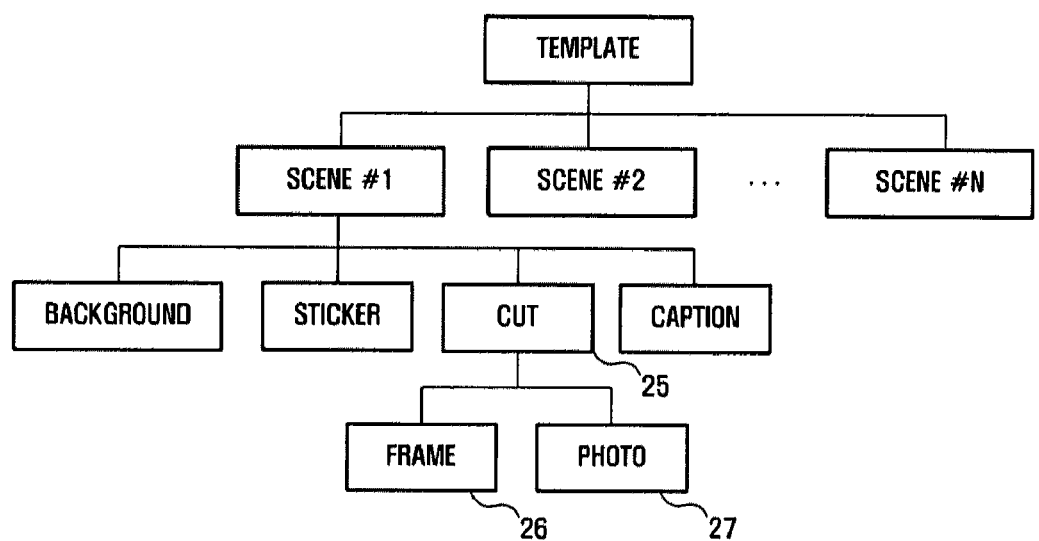
FIG. 6 illustrate the hierarchical structure of a template, according to an embodiment of the present invention.
Figure 7:
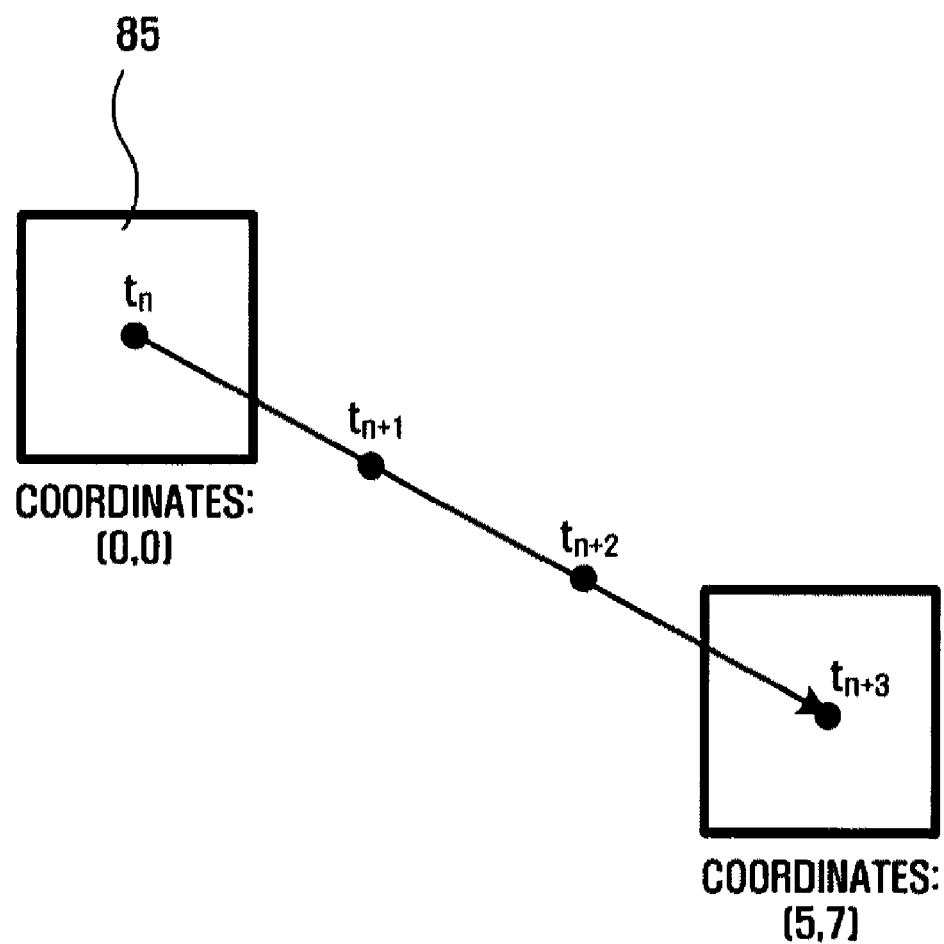
FIG. 7 illustrate the frame-wise calculation of an object attribute, according to an embodiment of the present invention.

FIG. 6 illustrates a hierarchical structure of a template. Referring to FIG. 6, a template may include a plurality of scenes, e.g., scene 1, scene 2, . . . , scene N, and each of scene 1, scene 2, . . . , scene N may include a variety of objects such as backgrounds, cuts, captions, and stickers. In the hierarchy illustrated in FIG. 6, an element may control one or more sub-elements located directly thereunder. In this manner, all the elements in the hierarchy illustrated in FIG. 6 can be sequentially controlled. An object may include one or more other objects as sub-elements. For example, when a predetermined dynamic effect is applied to an element "cuts" 25, the same dynamic effect may also be applied to an element "frames" 26 and an element "photos" 27, which are sub-elements of the element "cuts" 25. For example, even when a rotation effect is applied only to the element "cuts" 25, the element "frames" 26 and the element "photos" 27 may inherit the attributes of the element "cuts" 25, so that they are rotated along with the element "cuts" 25.

Referring to FIG. 6, the template may be controlled by the template controller 150, and scenes 1, 2, . . . , N may be controlled by the scene controller 160, and the objects, including the element "cuts" 25, the element "frames" 26 and the element "photos" 27, may be controlled by the object controller 170.

In detail, the template controller 150 may set a time tab according to a predetermined frame rate. The time tab typically indicates when to display a moving image. For example, when the predetermined frame rate is 30 frames per second (fps), 30 time tabs are set for each second. The template controller 150 may identify one or more scenes of a template and the configuration of the template by parsing the script 30, and may load the results of the parsing into a predetermined memory (not shown).

The scene controller 160 may identify one or more objects included in a certain scene and an execution module 50 that defines dynamic effects for the identified objects with reference to the results of the parsing performed by the template controller 150. The scene controller 160 may then load one of the identified objects and the execution module 50.

Then, the object controller 170 may create a control code for each of the identified objects (e.g., the objects 40) based on the loaded object and the execution module 50. The control code may be metadata, which is used to execute the identified objects in units of time tabs.

The control code may be recorded in the execution module 50, which defines the dynamic effects for each of the identified objects, or may be recorded in the certain scene, which is an element comprising the identified objects as sub-elements. For example, a sticker having a jpg format may not include a control code of its own due to the characteristics of the jpg format. Here, a control code specifying the location, size, and angle of the sticker may be recorded in a scene, which is an element comprising the sticker as a sub-element.

A control code may specify the attributes of an object at any given time tab during the display of the object. For example, assuming that an object 85 has a dynamic effect and thus moves from a point $t_n$ represented by a pair of coordinates (0, 0) (x=y=0) to a point $t_{n+3}$ represented by a pair of coordinates (5, 7), and that it takes the object 85 three time tabs, i.e., $t_{n+1}$ through $t_{n+3}$, to move from the point $t_n$ to the point $t_{n+3}$, the coordinates of the location of the object 85 at the time tab $t_{n+1}$ and the coordinates of the location of the object 85 at the time tab $t_{n+2}$ may be respectively calculated as (5/3, 7/3) and (10/3, 14/3). Here, a control code for the object 85 may include the attributes of the object 85 for each of the four time tabs $t_n$ through $t_n+3$, i.e., the x- and y-axis coordinates, depth, rotation angle, width, height, and transparency of the object 85.

As described above, according to an embodiment, a control code for each object in a predetermined scene may be recorded in the execution module 50. Accordingly, when an arbitrary time tab is accessed, the attributes of all objects in a predetermined scene at the arbitrary time tab may be readily identified using the value of the arbitrary time tab.

That is, when a user performs a time-seek operation such as a rewind or arbitrary access operation, the template controller 150 may provide the scene controller 160 with the value of a predetermined time tab. Then, the scene controller 160 may issue to the object controller 170 a request for the attributes of objects at the predetermined time tab. The object controller 170 may read a control code recorded in the execution module 50, and provide the scene controller 160 with the attributes of the objects at the predetermined time tab such as the locations, sizes, and rotation angles of the objects at the predetermined time tab. Then, the scene controller 160 may combine the objects in the predetermined scene and the attributes of the objects, thereby obtaining a still image corresponding to the predetermined time tab.

The template controller 150 may operate under the control of the template execution unit 120, the template-organizing unit 130, and the template storage unit 140, for example. The template execution unit 120, the template-organizing unit 130, and the template storage unit 140 may interact with a user via the user interface 110.

Figure 8:
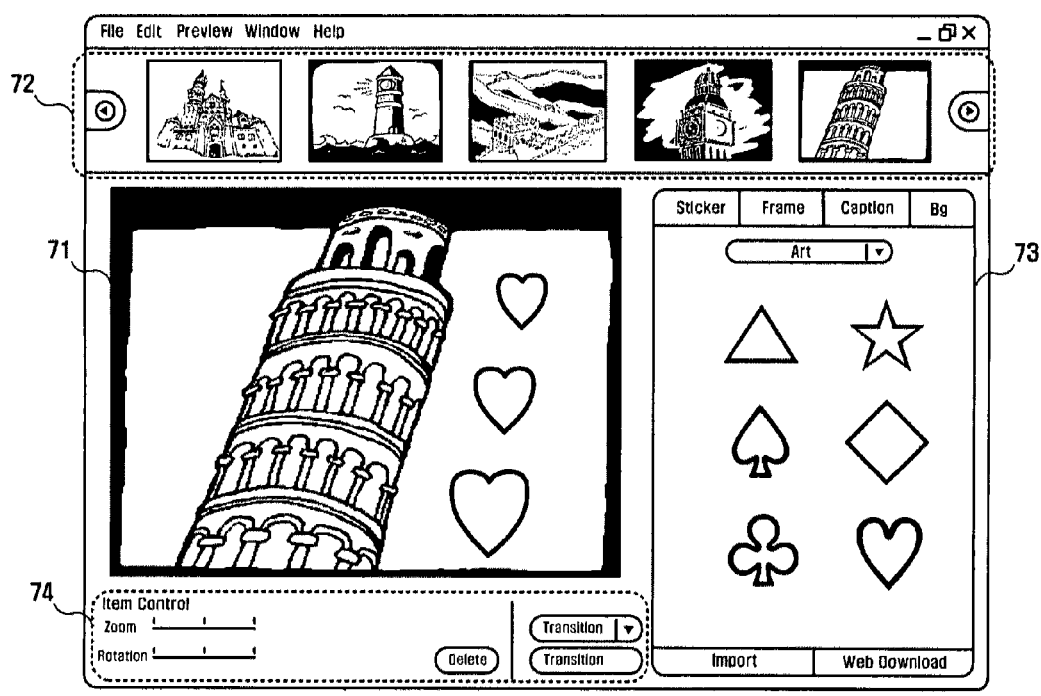
FIG. 8 illustrate an example of the user interface illustrated in FIG. 4.

FIG. 8 illustrates an example of the user interface 110 illustrated in FIG. 4, according to an embodiment of the present invention. Referring to FIG. 8, for the purpose of implementing organizing functions in a more simplified manner, the user interface 110 may not be provided with timeline organizing functions. The user interface 110 may provide an organizing function by which objects in each scene may be separated as independent files and may thus be organized separately, instead of providing a complicated animation organizing function. Most scenes or objects may be selected using a drag-and-drop operation.

The user interface 110 may include, for example, a work zone 71, a scene arrangement zone 72, an object palette 73, and an object control zone 74.

The work zone 71 is an area where a scene (hereinafter referred to as the current scene) currently being selected by a user may actually be organized. The work zone 71 is an interface for arranging objects in the current scene and organizing the current scene with reference to the attributes of the objects in the current scene, e.g., the sizes and rotation angles of the objects in the current scene. A dynamic effect accompanied by each of the objects in the current scene may not be readily identified in the work zone 71. The current scene can be readily executed using a preview button included in the object control zone 74.

The scene arrangement zone 72 is an interface for identifying the configuration of scenes and changing the order in which the scenes are arranged using a drag-and-drop operation. The scene arrangement zone 72 may allow a user to delete a scene, add a new scene, or switch scenes using one or more icons (not shown) that are displayed when a scene is selected.

The object palette 73 is an interface for adding objects such as stickers, frames, captions, and backgrounds to a scene or modifying the objects. Stickers and captions may be readily added to a scene simply by being dragged and dropped into the work zone 71. Frames and backgrounds may be assigned to a scene, one at a time. Thus, a frame image or a background image of the current scene may be switched simply by a user clicking a "Frame" or "Bg" button.

The object control zone 74 is an interface for organizing the current scene or the attributes of the objects in the current scene, e.g., the sizes and rotation angles of the objects in the current scene. Slide bars and icons displayed in the object control zone 74 may be activated or deactivated according to which of the objects of the current scene is selected in the work zone 71. Thus, a user may be able to intuitively determine what attributes can be organized based on the slide bars and the icons displayed in the object control zone 74.

Referring back to FIG. 4, when the user issues an execution command, e.g., when the user issues a request for a template preview or a time-seek operation using the user interface 110, the template execution unit 120 may control the template controller 150 to execute a current template. The template controller 150 may execute a moving image in units of time tabs that are set in advance, and provide the template execution unit 120 with a result image obtained by the execution. The template execution unit 120 may provide the user with the result image using the user interface 110.

When the user issues a command for organizing a template, e.g., when the user issues a request for addition, modification, or deletion of a scene or an object in a scene using the user interface 110 illustrated in FIG. 8, the template-organizing unit 130 may control the template controller 150 to modify the script 300 so that the configuration of the current template may be modified.

The template storage unit 140 may store a template newly created or organized in a predetermined file format so that the template may be used by various moving image generation systems. The predetermined file format may be defined in various ways. The predetermined file format may include, for example, the script 30 which defines the configuration of a moving image, the objects 40 which make up the moving image, the execution module 50, which defines dynamic effects accompanied by the objects 40, and source data of the objects 40. The execution module 50 may include a control code for executing the moving image in units of time tabs.

In the above description, each of the respective components shown in FIG. 3 may be a software or hardware component, such as a Field Programmable Gate Array (FPGA) or an Application Specific Integrated Circuit (ASIC), which performs certain tasks, classes, subroutines, processes, object-oriented software, executable threads, or programs.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, it is possible for an ordinary user to easily generate a template for generating a time-structured moving image and to set various attributes of each object of the moving image according to his/her preferences.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system organizing a template for creating a moving image, the system comprising:
    a template controller to generate a plurality of time tabs specifying regularly spaced time offsets according to a predetermined frame rate of the moving image and designate a time tab among the plurality of time tabs indicating when to display the moving image, wherein the template controller identifies one or more scenes of the moving image by parsing a script in response to a user command;
    a scene controller to identify, by a processor, one or more objects included in each of the scenes and an execution module to define dynamic effects for each of the objects and to load the identified objects and the identified execution module;
    an object controller to create a control code for each of the identified objects based on the loaded objects and the loaded execution module, the control code controlling the identified objects according to the designated time tab and specifying one or more attributes of each of the identified objects at each time tab during display of the moving image; and
    a template storage unit to store the template that includes the script, the execution module, the objects, and the control code.

2. The system of claim 1, wherein the control code includes an identifier and attributes for each of the objects.

3. The system of claim 2, wherein the attributes include at least one of x- and y-axis coordinates, depth, rotation angle, width, height, and transparency.

4. The system of claim 1, wherein the template controller receives an execute command from the user and controls the moving image to be executed in units of time tabs.

5. The system of claim 4, wherein the scene controller creates an integrated image for a predetermined time tab using a control code that is provided by the object controller for one or more objects in a current scene.

6. The system of claim 1, wherein the dynamic effects comprise at least one of movement, enlargement, reduction, rotation, animation, transition, and camera work.

7. The system of claim 1, wherein the script includes the scenes, the objects included in each of the scenes, and a uniform resource locator (URL) of the execution module.

8. The system of claim 1, wherein the control code is recorded in the execution module or in an element including the execution module as a sub-element.

9. The system for claim 1, wherein an object includes the same attributes as an object directly located thereon.

10. The system of claim 1, wherein each of the objects includes an execution module that defines dynamic effects for a corresponding object.

11. The system of claim 1, further comprising a user interface that arranges one or more objects included in a scene selected by the user and comprises at least four distinct screen areas including:
    a work zone which arranges one or more objects in a scene selected by the user and displays a screen for execution of the template;
    a scene arrangement zone which enables the user to identify the configuration of scenes and change the order in which the scenes are arranged using a drag-and-drop method;
    an object palette which enables the addition of new objects to the selected scene or modifies the objects in the selected scene; and
    an object control zone which enables the organization of the selected scene or the attributes of the objects in the selected scene.

12. The system of claim 1, further comprising a user interface to receive the user commands for organizing the template.

13. A method of organizing a template for creating a moving image, the method comprising:
    identifying one or more scenes of a moving image by parsing a script in response to a user command;
    generating a plurality of time tabs specifying regularly spaced time offsets according to a predetermined frame rate of the moving image, and designating a time tab among the plurality of time tabs indicating when to display the moving image;
    identifying, by a processor, one or more objects included in each of the scenes and an execution module that defines dynamic effects for each of the objects;
    loading the identified objects and the identified execution module;
    creating a control code for each of the identified objects based on the loaded objects and the loaded execution module, the control code controlling the identified objects according to the designated time tab and specifying one or more attributes of each of the identified objects at each time tab during display of the moving image; and
    storing the template that includes the script, the execution module, the objects, and the control code.

14. The method of claim 13, wherein the control code includes an identifier and attributes for each of the objects.

15. The method of claim 14, wherein the attributes include at least one of x- and y-axis coordinates, depth, rotation angle, width, height, and transparency.

16. The method of claim 13, further comprising receiving an execute command from the user and controlling the moving image to be executed in units of time tabs.

17. The method of claim 16, further comprising creating an integrated image for a predetermined time tab using the control code.

18. The method of claim 13, wherein the dynamic effects comprise at least one of movement, enlargement, reduction, rotation, animation, transition, and camera work.

19. The method of claim 13, wherein the script includes the scenes, the objects included in each of the scenes, and a uniform resource locator (URL) of the execution module.

20. The method of claim 13, wherein the control code is recorded in the execution module or in an element including the execution module as a sub-element.

21. At least one medium comprising computer readable code to control at least one processing element to implement the method of claim 13.

22. The method of claim 13, further comprising receiving the user commands for organizing the template.

23. A system organizing a template for creating a moving image including one or more scenes, the system comprising:
  a template controller to generate a plurality of time tabs specifying regularly spaced time offsets according to a predetermined frame rate of the moving image, and designate a time tab among the plurality of time tabs indicating when to display the moving image;
  a scene controller to identify, by a processor, one or more objects included in each of the scenes and to identify an execution module to define dynamic effects for each of the objects, the scene controller to load the identified objects and the identified execution module; and
  an object controller to create a control code for each of the identified objects based on the loaded objects and the loaded execution module, the control code controlling the identified objects according to the designated time tab and specifying one or more attributes quantifying characteristics of each of the identified objects at each time tab during display of the moving image,
  wherein the template controller identifies one or more scenes of the moving image by parsing a script and controls the scene controller to execute the one or more scenes based on the script, while the scene controller controls the object controller to execute the one or more objects according to the control code.

24. The system of claim 23, wherein the template is organized into a hierarchical structure having elements comprising the one or more scenes and the one or more objects.

25. The system of claim 24, wherein the template is comprised of the one or more scenes and each scene is comprised of the one or more objects, whereby in the hierarchical structure, each element controls one or more sub-elements belonging to the each element.

* * * * *